(12) United States Patent
Buccinna

(10) Patent No.: US 8,616,625 B2
(45) Date of Patent: Dec. 31, 2013

(54) SEAT HEADREST

(75) Inventor: Antonio Buccinna, Livonia, MI (US)

(73) Assignee: Johnson Controls Technology Company, Holland, MI (US)

( * ) Notice: Subject to any disclaimer, the term of this patent is extended or adjusted under 35 U.S.C. 154(b) by 109 days.

(21) Appl. No.: 12/919,280

(22) PCT Filed: May 22, 2009

(86) PCT No.: PCT/US2009/044946
§ 371 (c)(1),
(2), (4) Date: Sep. 13, 2010

(87) PCT Pub. No.: WO2009/143408
PCT Pub. Date: Nov. 26, 2009

(65) Prior Publication Data
US 2011/0057495 A1  Mar. 10, 2011

Related U.S. Application Data

(60) Provisional application No. 61/055,523, filed on May 23, 2008.

(51) Int. Cl.
*B60N 2/48* (2006.01)

(52) U.S. Cl.
USPC ............................. 297/61; 297/408; 297/410

(58) Field of Classification Search
USPC ...................... 297/61, 216.12, 391, 408, 410
See application file for complete search history.

(56) References Cited

U.S. PATENT DOCUMENTS

| 5,052,754 | A | 10/1991 | Chinomi |
| 5,823,619 | A | 10/1998 | Heilig et al. |
| 6,082,817 | A * | 7/2000 | Muller ..................... 297/216.12 |
| 6,213,548 | B1 | 4/2001 | Van Wynsberghe et al. |
| 6,299,254 | B1 * | 10/2001 | Dinh et al. .................... 297/408 |
| 6,485,096 | B1 | 11/2002 | Azar et al. |
| 6,511,130 | B2 * | 1/2003 | Dinkel et al. ................. 297/410 |
| 6,557,933 | B1 | 5/2003 | Schambre et al. |
| 6,767,064 | B2 | 7/2004 | Veine et al. |
| 6,779,839 | B2 | 8/2004 | Andreasson et al. |
| 6,824,212 | B2 | 11/2004 | Malsch et al. |
| 7,044,555 | B2 * | 5/2006 | Saberan ........................ 297/408 |
| 7,059,681 | B2 * | 6/2006 | Kubo ............................ 297/410 |

(Continued)

FOREIGN PATENT DOCUMENTS

| DE | 19727097 C2 | 1/1998 |
| DE | 19832902 A1 | 1/2000 |

(Continued)

OTHER PUBLICATIONS

National Highway Traffic Safety Admin., DOT, Section 571.202a, pp. 531-542.

(Continued)

*Primary Examiner* — Peter Brown
(74) *Attorney, Agent, or Firm* — Dickinson Wright PLLC

(57) ABSTRACT

A seat assembly having headrest that includes an expansion assembly that operates to expand the cushion when the headrest is in the lower position. As the headrest is raised, the expansion assembly retracts, removing the bulge and creating a more planar surface for comfortably resting the head of a seat occupant. The headrest is also configured to reduce expansion of flatten as the seatback is folded flat.

1 Claim, 16 Drawing Sheets

(56) References Cited

U.S. PATENT DOCUMENTS

| | | | |
|---|---|---|---|
| 7,350,859 B2 * | 4/2008 | Klukowski | 297/216.12 |
| 7,552,973 B2 * | 6/2009 | Linardi et al. | 297/408 |
| 8,123,292 B2 * | 2/2012 | Nishiura et al. | 297/216.12 |
| 2002/0079723 A1 | 6/2002 | Risch et al. | |
| 2007/0145803 A1 | 6/2007 | Kopetzky et al. | |
| 2008/0073963 A1 | 3/2008 | Mauro et al. | |

FOREIGN PATENT DOCUMENTS

| | | |
|---|---|---|
| DE | 19841599 A1 | 3/2000 |
| DE | 10008524 B4 | 8/2001 |
| DE | 10027585 A1 | 12/2001 |
| DE | 10041528 A1 | 3/2002 |
| DE | 10119953 A1 | 11/2002 |
| DE | 10254691 B4 | 6/2004 |
| DE | 102005015167 A1 | 10/2006 |
| DE | 102006033137 A1 | 3/2007 |
| EP | 1038723 A2 | 9/2000 |
| EP | 1316471 B1 | 10/2005 |
| FR | 2749812 A1 | 12/1997 |
| GB | 2369774 A | 6/2002 |
| GB | 2423708 A | 9/2006 |
| WO | 2006050990 A1 | 5/2006 |
| WO | 2007030514 A2 | 3/2007 |
| WO | 2008026372 A1 | 3/2008 |

OTHER PUBLICATIONS

Non-Use Positions, pp. 58-71.

Murphy, Tom; New Rules for Head Restraints; WardsAuto.com; Oct. 1, 2006; 4 pages.

Grammer Active Head Restraints at 2005 SAE; Apr. 11, 2008; 2 pages.

Riedemann, Patrick; Customer Study: Shingled Head Restraints; DaimlerChrysler Customer Research Center; Mar. 2007; pp. 1-25.

* cited by examiner

SEAT HEADREST

CROSS REFERENCE TO RELATED APPLICATION

This U.S. National Stage Patent Application claims priority to PCT Patent Application International Serial No. PCT/US2009/044946 filed on May 22, 2009, entitled "Seat Headrest" which claims priority to U.S. Provisional Application Ser. No. 61/055,523 filed on May 23, 2008, entitled "Expandable STO Headrest", the entire disclosures of these applications being considered part of the disclosure of this application and hereby incorporated by reference.

BACKGROUND OF THE INVENTION

1. Field of the Invention

This invention is generally directed to vehicle seats including headrests and more particularly rear seats having headrests commonly referred to as "shingle" style headrests, which include cushion bulges to incentivize an occupant to relocate the headrest to a proper height.

2. Related Art

Headrests are commonly used in motor vehicle seats to protect an occupant's head and neck from injury during a rear-end collision. To be effective, the headrest must be positioned a sufficient distance above the backrest of the seat relative to the seat occupant, as specified by applicable motor vehicle standards.

In the case of unoccupied rear seat assemblies, a headrest raised to the normal "use" position will generally block a driver's rearward field of view, as depicted in FIG. 1. With traditional styles of headrest or restraint, the prior art has taught to completely remove headrests from the seat if unoccupied. However, this is cumbersome, the headrests are difficult to store when removed and the headrests must be reinstalled before an occupant occupies the seat.

To address issues related to traditional headrests, the prior art has developed a headrest that is commonly called a "shingled" or shingle style head restraint as shown in FIGS. 2 and 3. The shingle head restraint is movable between raised (use) and lowered (non-use) positions. When in the lowered position, the headrest is configured to maximize the rear view for the operator of the vehicle by overlapping a substantial portion of the seatback. More specifically, when the seat is unoccupied, the shingled headrest can be pushed down, out of the driver's rearward field of view. Shingled headrests are also typically designed to be low profile in height in the lowered position, thereby not interfering substantially with the driver's view and minimizing the potential for interference with the seat in front when the seatback is folded down to a stowed position.

The shingled headrest must be placed in a raised, normal use position, and is configured such that if there is a passenger in the rear seat, they would be incentivized when the headrest is in a lowered, non-use position to manually or intentionally adjust the headrest upward. For example, the bulge of the cushion, best illustrated in FIG. 3, when the seatback is upright and the headrest is in the lower position, pushes the seat occupant forward in the upper back area creating discomfort.

The headrest should be movable to a lowered position so as not to unduly obstruct the rear view for a driver when the seat is unoccupied. While some headrests include motors and remote controls that allow drivers to flip the headrest, these are generally expensive and may interfere with the seat folding flat. In addition, if the headrest ever sticks in the flipped forward position, the seat is generally unusable.

The headrest should also be designed in a manner to incentivize an occupant of the seat to raise or otherwise place the headrest in its normal use position when a person occupies the seat. One solution in the prior art seeks to configure the headrest with a fixed bulge that provides an uncomfortable bulge in the lower condition, thereby forcing an occupant to sit in discomfort until the headrest is placed in a proper use position for the seat occupant. While various strategies have been proposed, most have associated issues, such as exemplary illustrated in FIG. 3, where a bulging shingle-type headrest can create problems when the seatback is folded to a stowed position. More specifically, to make the lower portion comfortable for sitting, the bulging portion of the headrest contacts the seat cushion of the lower portion and may prevent the seatback portion from folding flat.

Accordingly, there is a need for an improved headrest which is configured to minimize obstruction of a driver's rear view when the seat is unoccupied, which incentivizes an occupant to raise the headrest to a use position, and which still allows the seatback to fold flat.

SUMMARY OF THE INVENTION

The invention is generally directed to vehicle seats including headrests and more particularly rear seats having headrests commonly referred to as "shingle" style headrests, which include cushion bulges to incentivize an occupant to relocate the headrest to a proper height.

The headrest is coupled to the seat by at least one extension tube and includes an expansion assembly that operates to expand the cushion away from the extension tube when the headrest is in the lower position. As the headrest is raised, the expansion assembly retracts, removing the bulge and creating a more planar surface for comfortably resting the head of a seat occupant. The headrest is also configured to reduce expansion of flatten as the seatback is folded flat. More specifically, the expansion assembly is coupled to a cable that releases the applied force to the expansion assembly and thereby allows the expansion assembly to retract.

The expansion assembly is generally formed from a skeletal structure, typically a linkage assembly. The expansion assembly generally includes a fixed member or link coupled to the extension tube. Extending from the fixed member is an intermediate link that is in turn coupled to a distal link. During expansion, the intermediate and distal link pivot relative to each other, as well as move relative to the fixed link, such that the intermediate link and distal link move from a position relatively aligned with the extension tube toward a position relatively perpendicular to the extension tube. The intermediate and distal links also move from a position that is closer to being aligned to a position that is closer to being perpendicular or even to an acute angle relative to each other. Of course, the intermediate and distal links do not need to reach the perpendicular position or even close to the perpendicular position to create the desired bulge. When the expansion assembly is relaxed, the intermediate and distal links move to a position more aligned with the extension tube and more aligned with each other.

DETAILED DESCRIPTION OF THE PREFERRED EMBODIMENT

Figure 1:
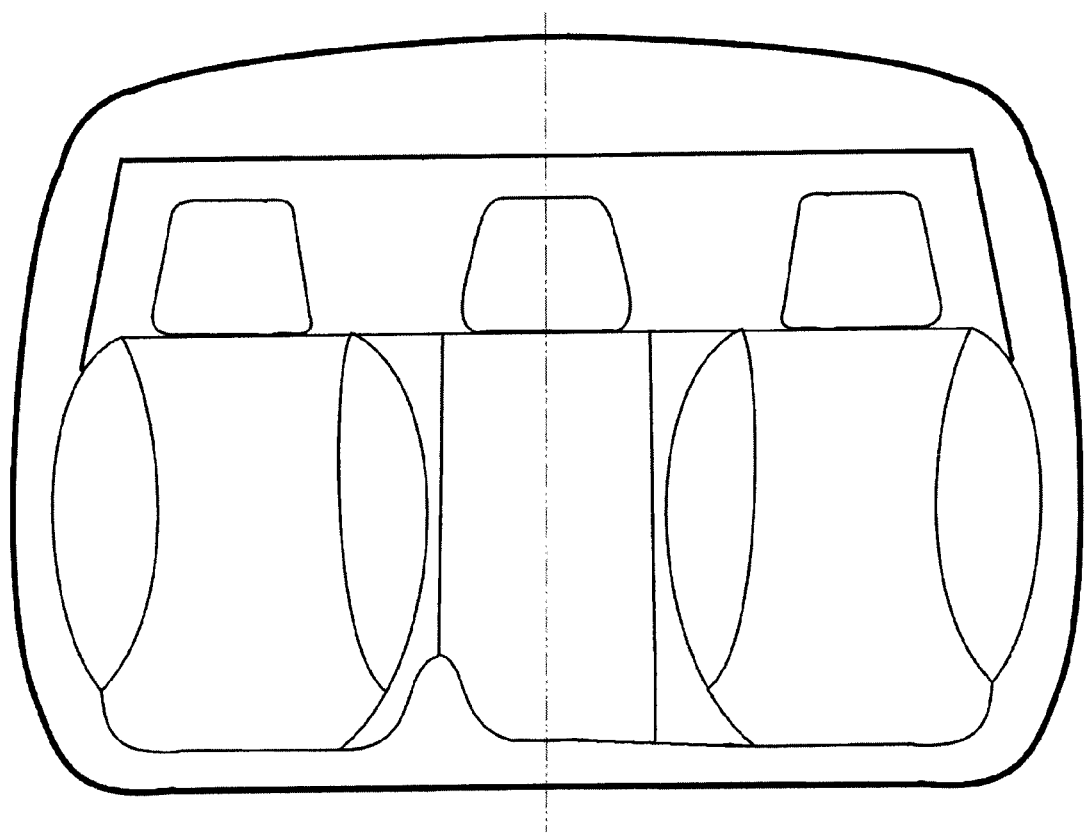
FIG. 1 is a front view of an exemplary prior art seat and headrest.
Figure 2:
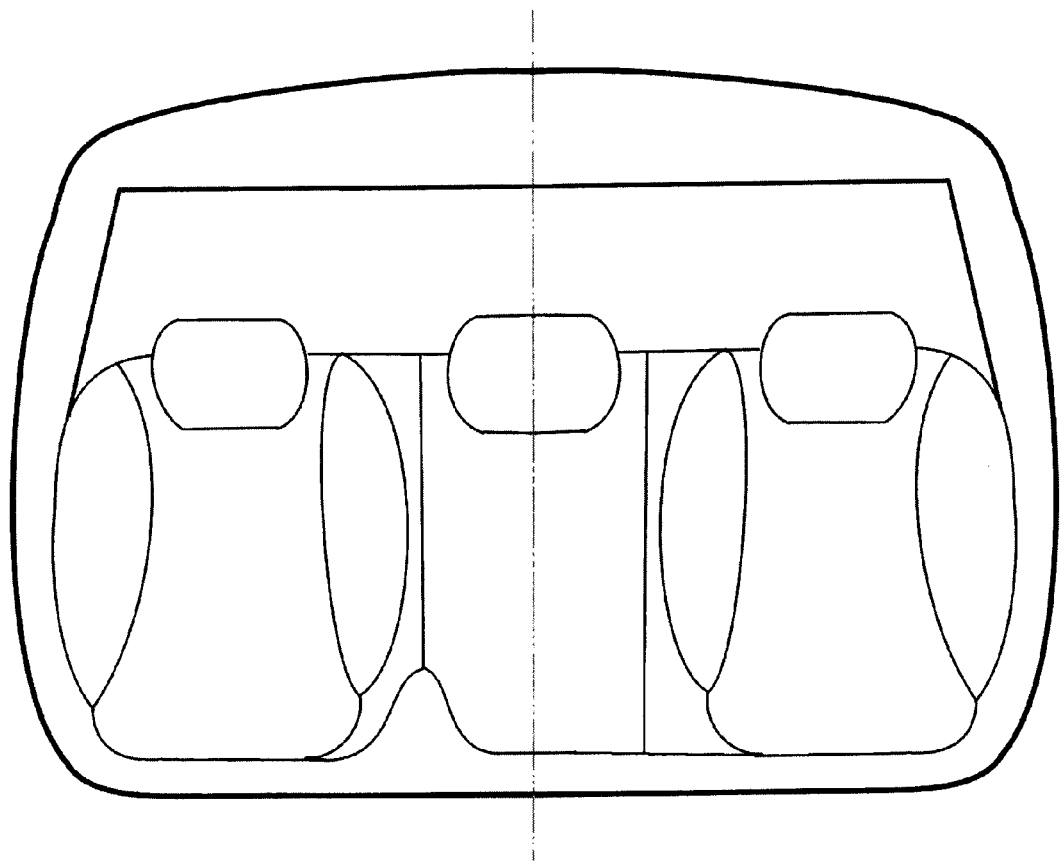
FIG. 2 is a front view of an exemplary prior seat and headrest with the headrest in a lowered position.
Figure 3:
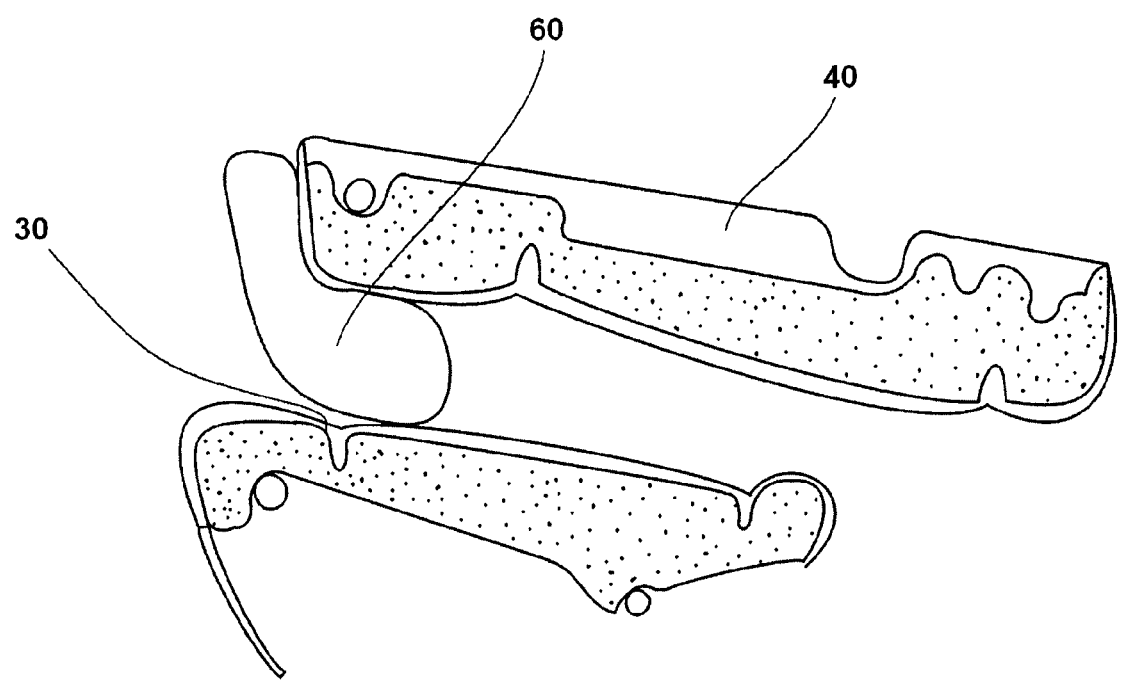
FIG. 3 is a schematic sectional view illustrating the problems associated with folding a seat with a fixed STO headrest cushion.
Figure 4:
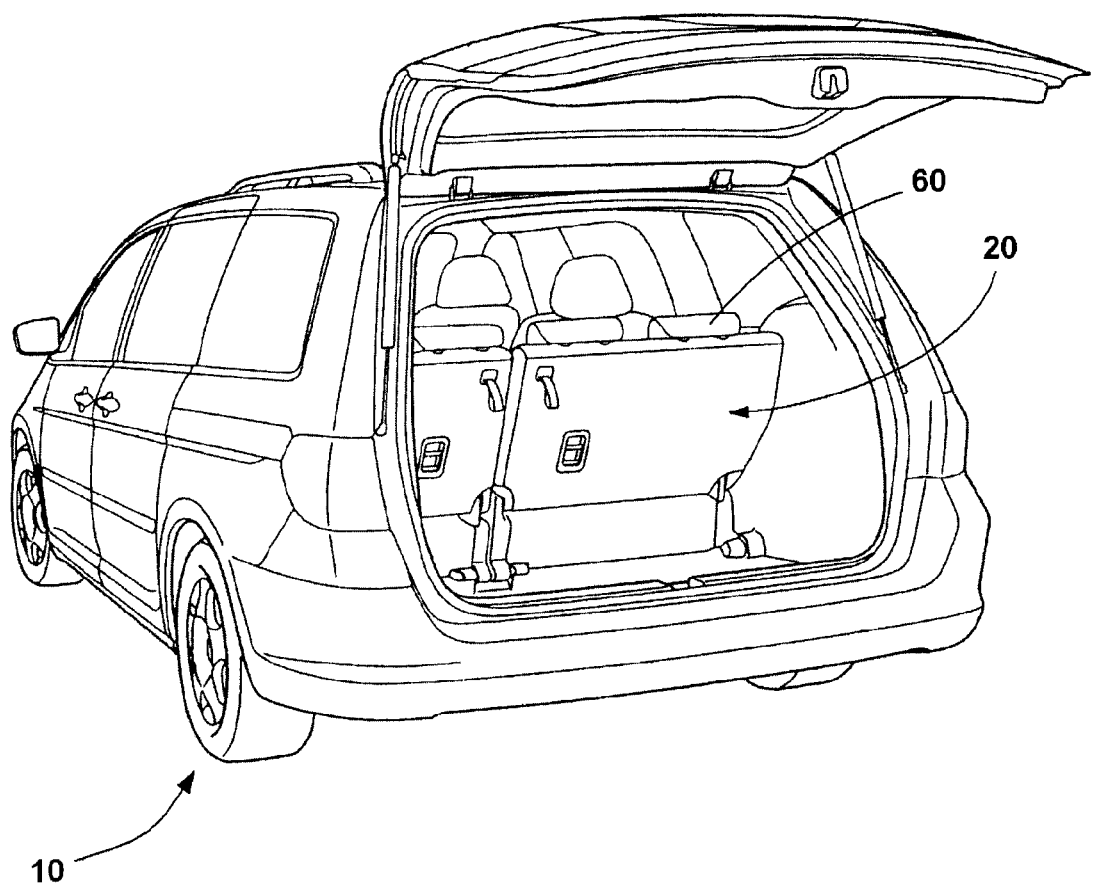
FIG. 4 is a rear perspective view of an exemplary seat in a vehicle.

As illustrated in the Figures, the present invention is directed to a seat assembly 20 for a vehicle 10. As illustrated in FIG. 4, the seat assembly 20 is generally directed to rear seat assemblies or mid row seat assemblies. The seat assembly 20 generally includes a seat cushion 30 and a seat back 40 pivotally coupled together at a seat pivot axis 50. A headrest 60 is coupled to the seat back 40 and generally includes an expansion assembly 80 that is configured to expand or flatten headrest 60 depending on the location of the headrest 60, or the seatback 40, relative to the seat cushion 30.

The seat assembly 20 can take on a variety of designs, styles and configurations and the seat assembly 20 represented in the figures is only exemplary. The seat cushion 30 and seatback 40 generally include a seating surface 32 formed by a surface material that surrounds a cushion, as well known in the art. The seat assembly 20 is not directed to the front seats of vehicles but instead to seats behind the driver where the headrest 60 may obstruct the rear view of the driver if it isn't lowered during operation of the vehicle.

The headrest 60 is generally styled or designed similar to many other shingled style headrests, but includes an expansion assembly 80 that allows the headrest to expand, or increase in width, and retract or decrease in width. The illustrated headrest is formed in an "L" shape with at least one extension rod or tube 70, preferably two, extending from the inner side of the L-shape and in particular from the shorter leg of the L-shape. The headrest 60 includes a cushion portion 64 that is surrounded by a surface material forming an outer covering 62. The outer covering 62 may be configured to stretch or flex, thereby allowing for easy expansion and retraction. The outer covering may be formed from two different surface materials, such as leather outer and sides with the inner side being formed from an elastic material that allows expansion while keeping the visible portions while the headrest is installed of the outer pulled tight to minimize wrinkles in the surface material. The extension rods 70 may be any style desired.

Figure 5:
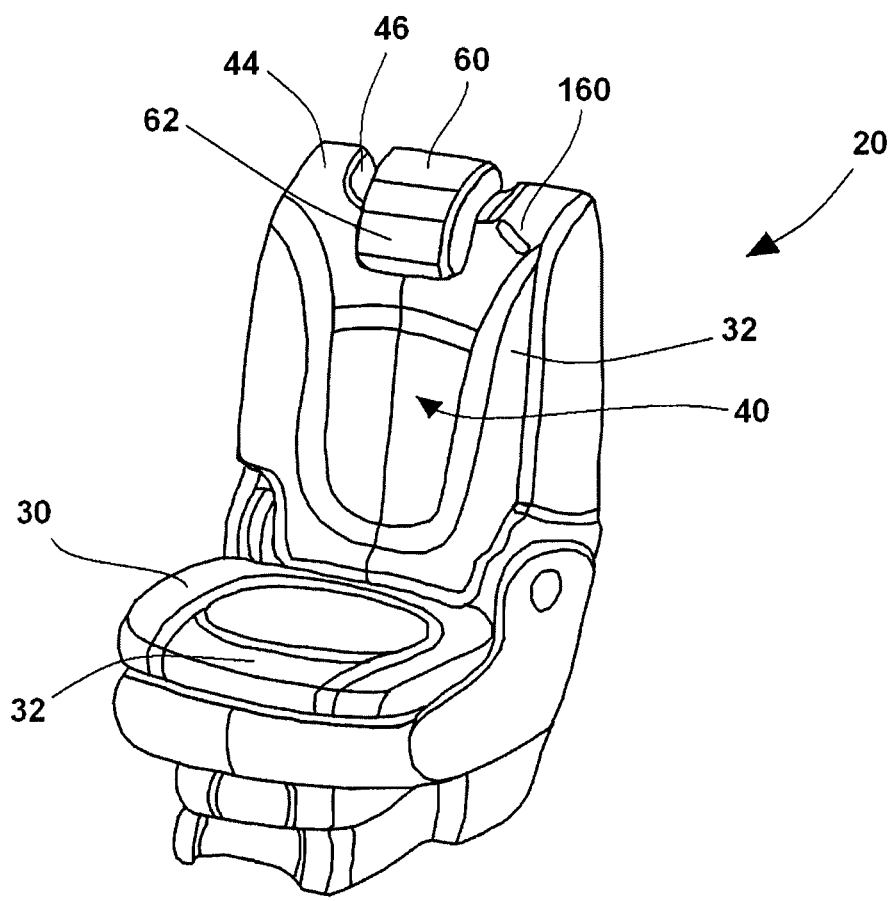
FIG. 5 is a front perspective view of an exemplary seat with the headrest in the lowered position.
Figure 6:
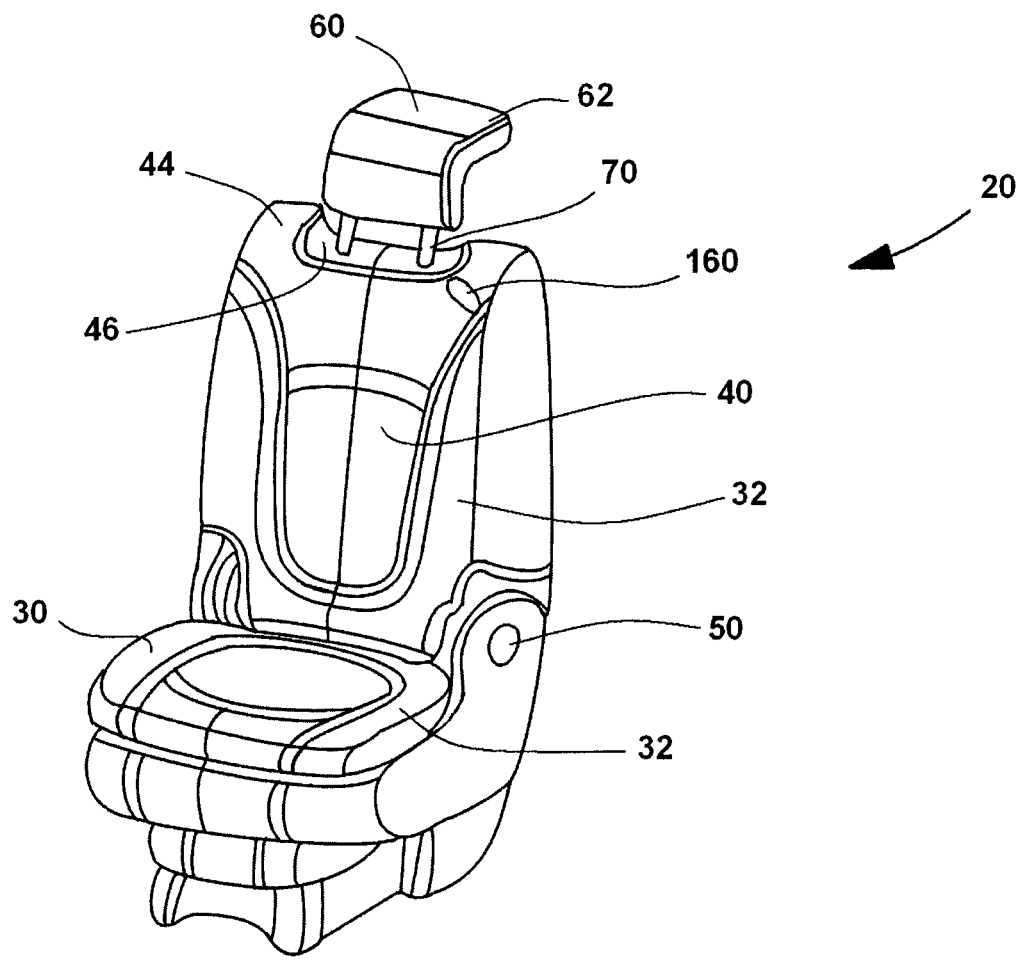
FIG. 6 is a front perspective view of an exemplary seat with the headrest in the raised position.
Figure 7:
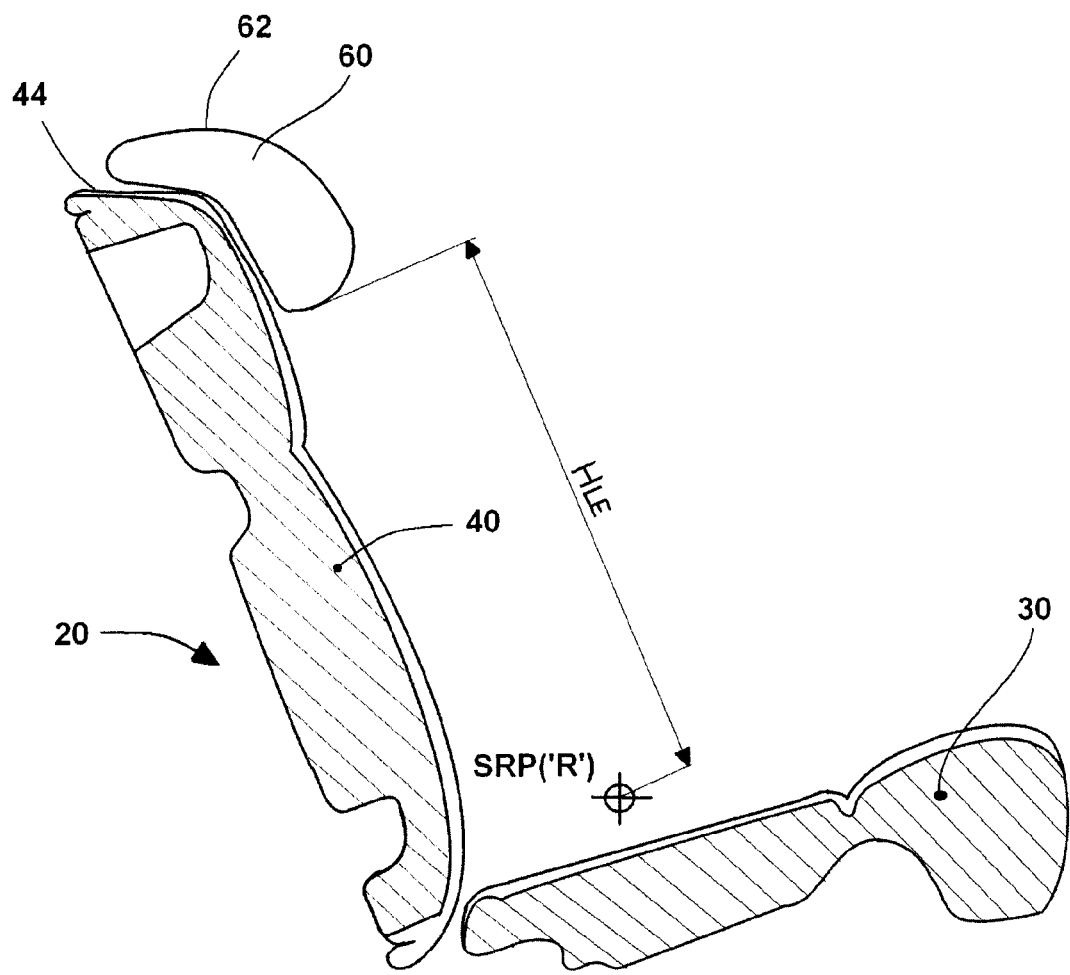
FIG. 7 is a sectional view of the exemplary seat with the headrest in a lowered and expanded position.

The shingled-style headrest 60 is carried at the upper end 44 of the seatback 40 upon a mechanical structure which enables the headrest 60 to be raised from the position illustrated in FIG. 5, which is a non-use position, to the elevated use position, generally illustrated in FIG. 6. The seatback 40 may include a recessed portion 46, as illustrated in the Figures to further improve the view of the driver by allowing the headrest 60 to be lowered approximately level with the upper edge 44 of the seatback 40. A pull strap 160 can be fitted to mechanically and conveniently raise the headrest 60 to the use position. Therefore, an occupant seated in the assembly 20 can quickly extend the headrest 60 to its use position simply by pulling the strap 160 as noted. An appropriate linkage, actuated by the strap 48, then forces the headrest 26 to an elevated position, such as that depicted in FIG. 6.

Figure 8:
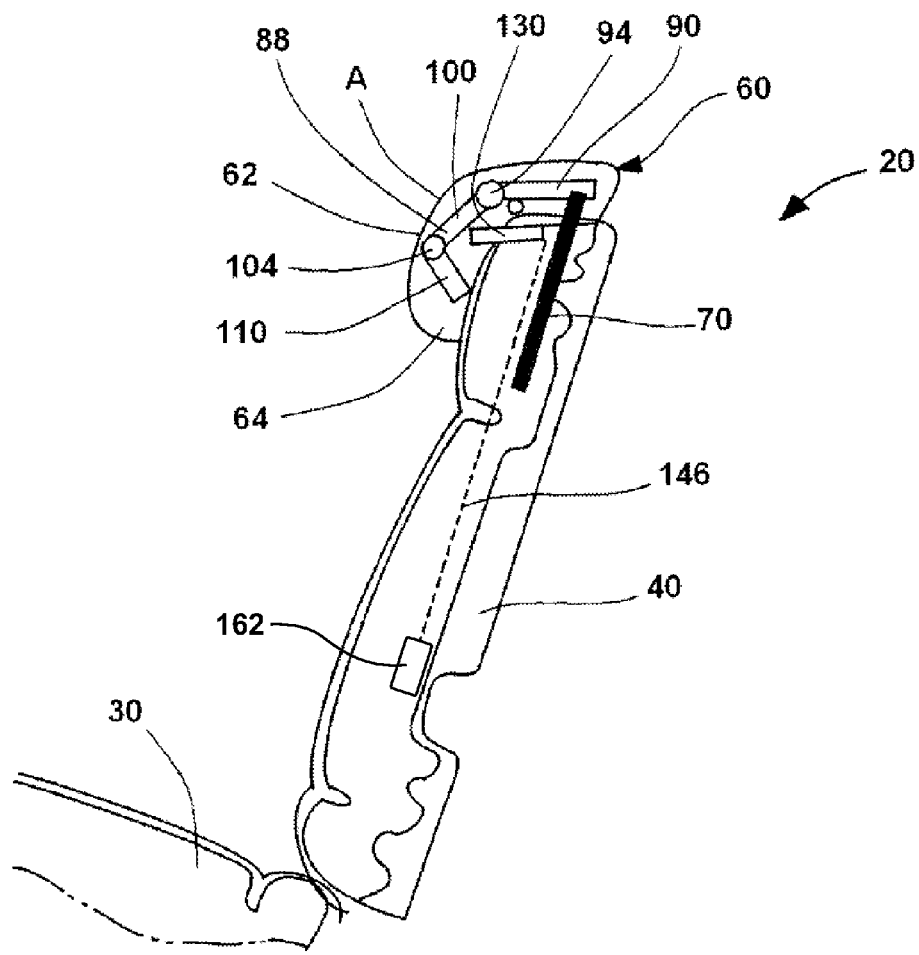
FIG. 8 is a schematic sectional view of the seat and headrest in the lowered and expanded position.
Figure 9:
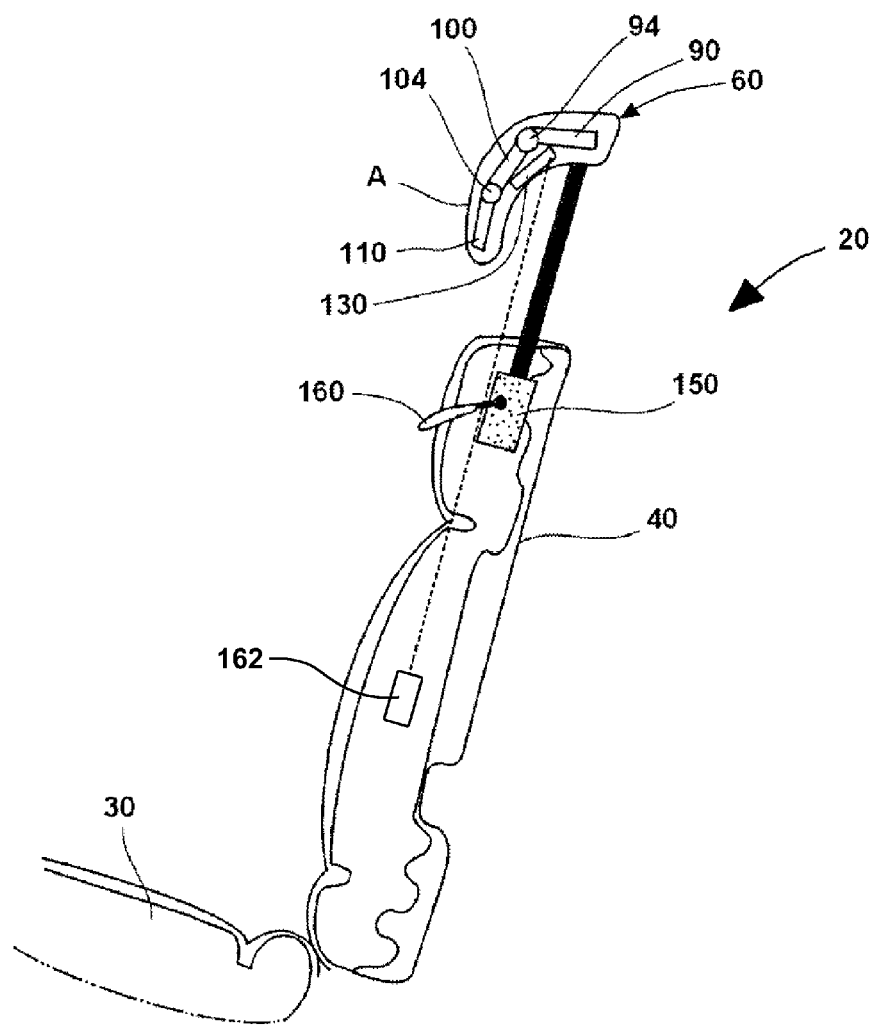
FIG. 9 is a schematic sectional view of the seat and headrest in the raised and retracted position.

FIGS. 8-9 are side views of the seat assembly 20 including the headrest 60 of the subject invention, wherein certain internal structures to the headrest 60 are shown in highly simplified, schematic form in particular the expansion assembly 80. The headrest 60 and more particularly the expansion assembly 80 is shown including an internal, skeletal structure 88 comprising a fixed link 90 that is preferably, but not necessarily, rigidly connected to the extension tubes 70 that are telescopically mounted within the seatback 40. Those of skill in the art will appreciate various alternative telescoping constructions other than extension tubes 70, such as a single bar or other articulating configuration (not illustrated) may be used. In this example, however, the fixed link 90 is rigidly and immovably connected relative to the extension tubes 70 so that the fixed link 90 moves up and down with the extension tubes 70 as the headrest 60 is raised and lowered.

The forward end of the fixed link 28 carries a first hinge 94 to which is pivotally connected an intermediate link 100. The intermediate link 100 is pivotally connected to a distal link 110 via a second hinge 104. Thus, the skeletal structure 88 of the headrest 60 includes a linkage assembly which is double-pivoted akin, somewhat, to a vehicular door hinge. These linkages and hinges are enveloped in a foam or other cushioning material 64, which is surrounded by a trim covering or outer covering 62 which may be leather, vinyl, cloth or other flexible fabric-like material. A so called "A-surface" of the headrest 60 is indicated by the letter "A." The A-surface directly contacts the back and/or head of a seated occupant.

To operate the expansion assembly 80, a push rod 130 or other appropriate device is disposed within the headrest 60 and acts between the fixed link 90 (or the extension tubes 70) and the intermediate link 100, in a four-bar linkage arrangement. The push rod 130 is controlled by a cable 146 represented in FIGS. 8 and 9 as a dashed line. When the cable 146 is pulled under tension by a cable pulling mechanism 162, the push rod 130 is manipulated so as to displace the intermediate link 100 toward the A-surface of the headrest 60, or away from the extension rods 70. As perhaps best shown in FIG. 11, a tension spring 134 or other suitable device is operatively disposed between the intermediate link 100 and the distal link 110. It is expected that the cable 146 will be coupled near the pivot axis 50, to allow the pivoting of the seatback 40 to interact with the expansion assembly 80, thereby expanding or flattening the headrest 60 depending upon the location of the headrest relative to the seat, as well as the location of the seatback 40 relative to the seat cushion 30.

Figure 11:
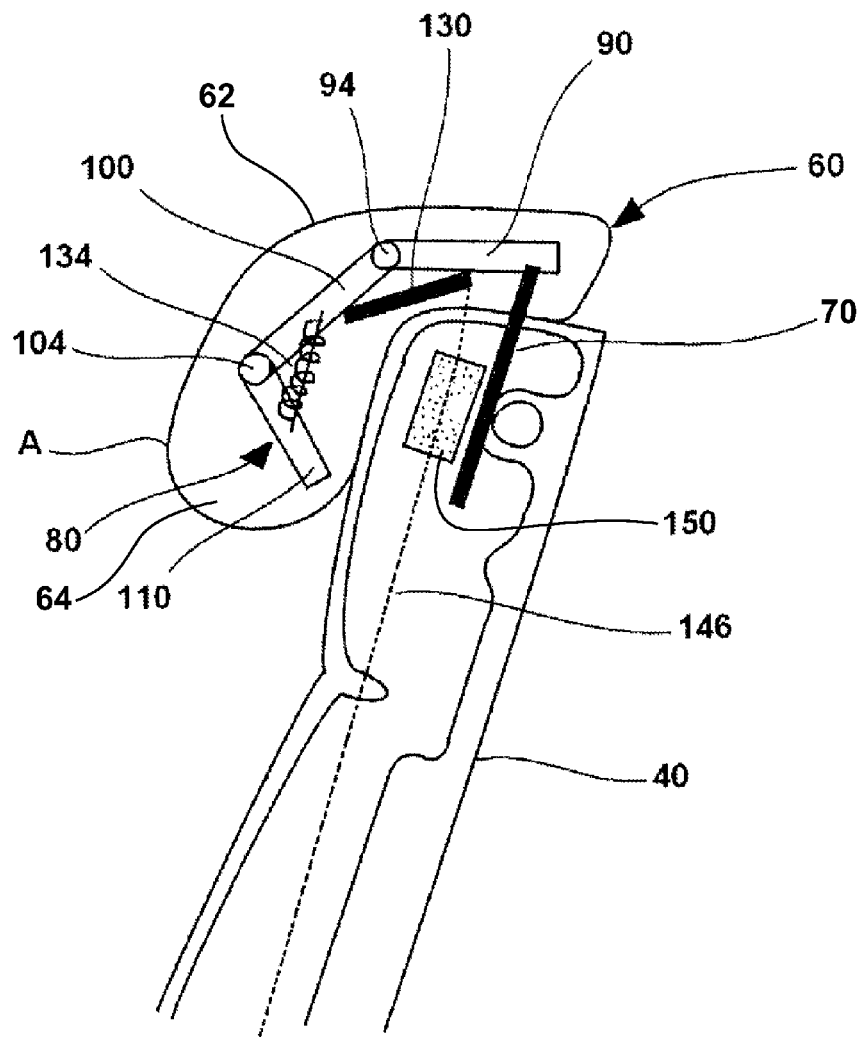
FIG. 11 is an enlarged sectional view of the headrest in a lowered and expanded position.
Figure 12:
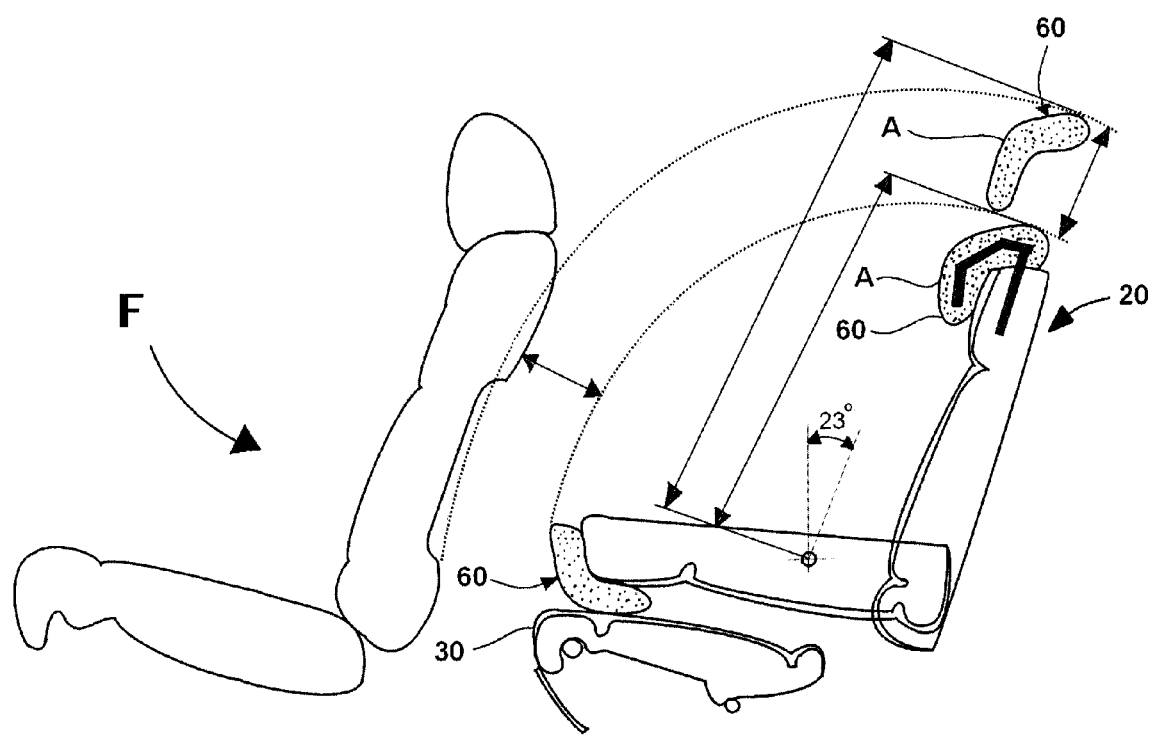
FIG. 12 is a side view of the front seat (F) and rear seats showing position of the seat and headrest during folding, relative to the front seat.
Figure 13:
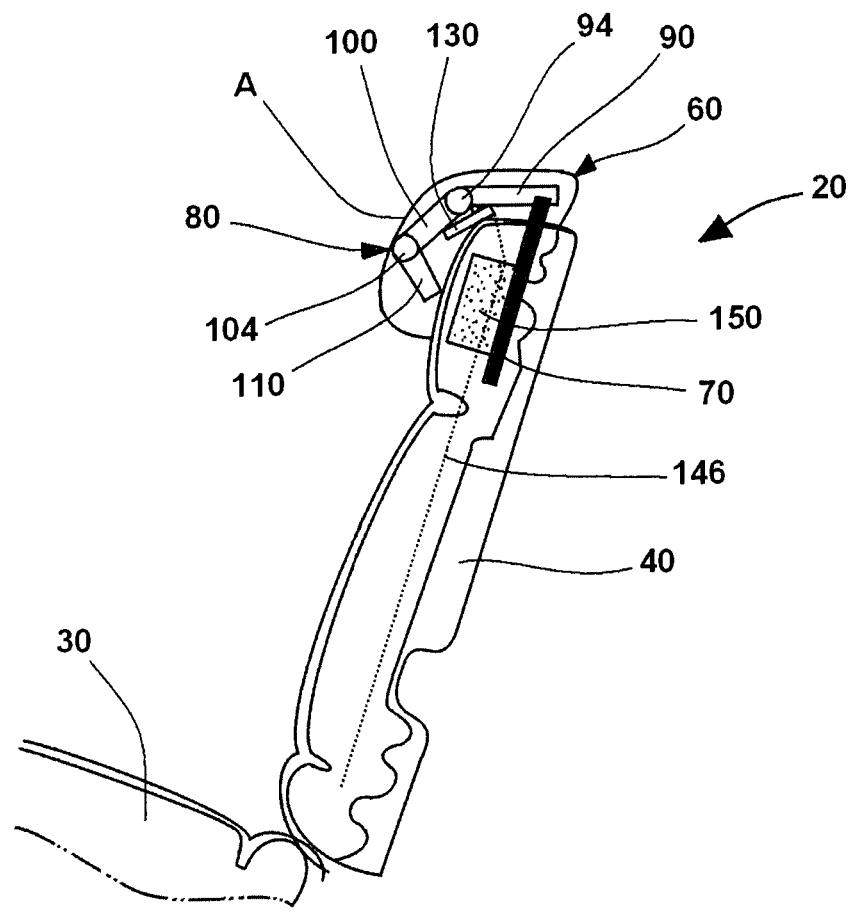
FIG. 13 is a schematic sectional view of the seat and headrest in the lowered and expanded position, and including a power assembly for raising and lowering the headrest.
Figure 14:
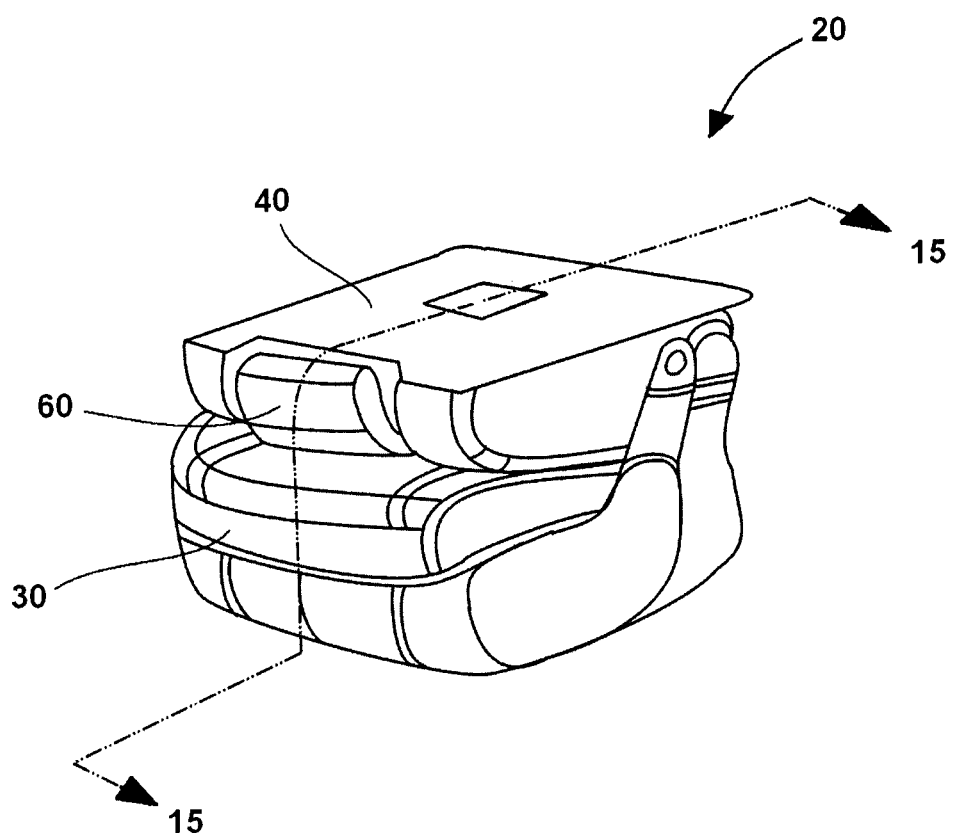
FIG. 14 is a perspective view of an exemplary seat in the folded position.

When the headrest 60 is in its lower, non-use position and the backrest 40 is raised, such as shown in FIGS. 8 and 11, the cable 142 is automatically pulled so as to manipulate the pushrod 130 and thrust the intermediate link 100 in a forward direction, away from the extension tubes 70. This, coupled with the action of spring 134, causes the intermediate 100 and distal 110 links to flex forward and retract backward at the same time, thus bulging outwardly the A-surface of the headrest 60, away from the extension tubes 70. This outward bulging is designed to create discomfort in the back of a seated occupant, thereby incentivizing the occupant to move the headrest 60 to a raised, normal use position such as shown in FIG. 9. However, when the headrest 60 is raised into the use position, as shown in FIG. 9, tension on the cable 146 is relaxed, and the push rod 130 is then manipulated such that the pivoting links relax and allow the A-surface of the headrest 60 to take on more of a planar position, with the intermediate link 100 and distal link 110 moving to be increasingly parallel thereby creating a headrest that is more typical of prior art shingle-type headrest shapes. When the headrest 60 is returned to its lower position, as shown in FIG. 11, the linkages inside the headrest 60 flex forward in the manner described above, thereby creating a substantial bulge in the headrest bun.

A mechanism box 150 illustrated in FIGS. 9 and 11 schematically represents a device which may be controlled by a pull strap 160 (FIG. 9) to conveniently raise the headrest 60 to its use position. Thus, an occupant simply pulls the strap 160, and gears, pulleys, levers or other mechanical features contained within the box 150 thrust the extension tubes 70 upwardly and result in the contortions of the headrest 60 to create the flat shape as described above. Alternatively, the box 150 may be motorized in such a way to move the headrest 26 between its raised and lowered positions under the force of an electric motor, hydraulic actuator, pneumatic actuator or the like.

Figure 10:
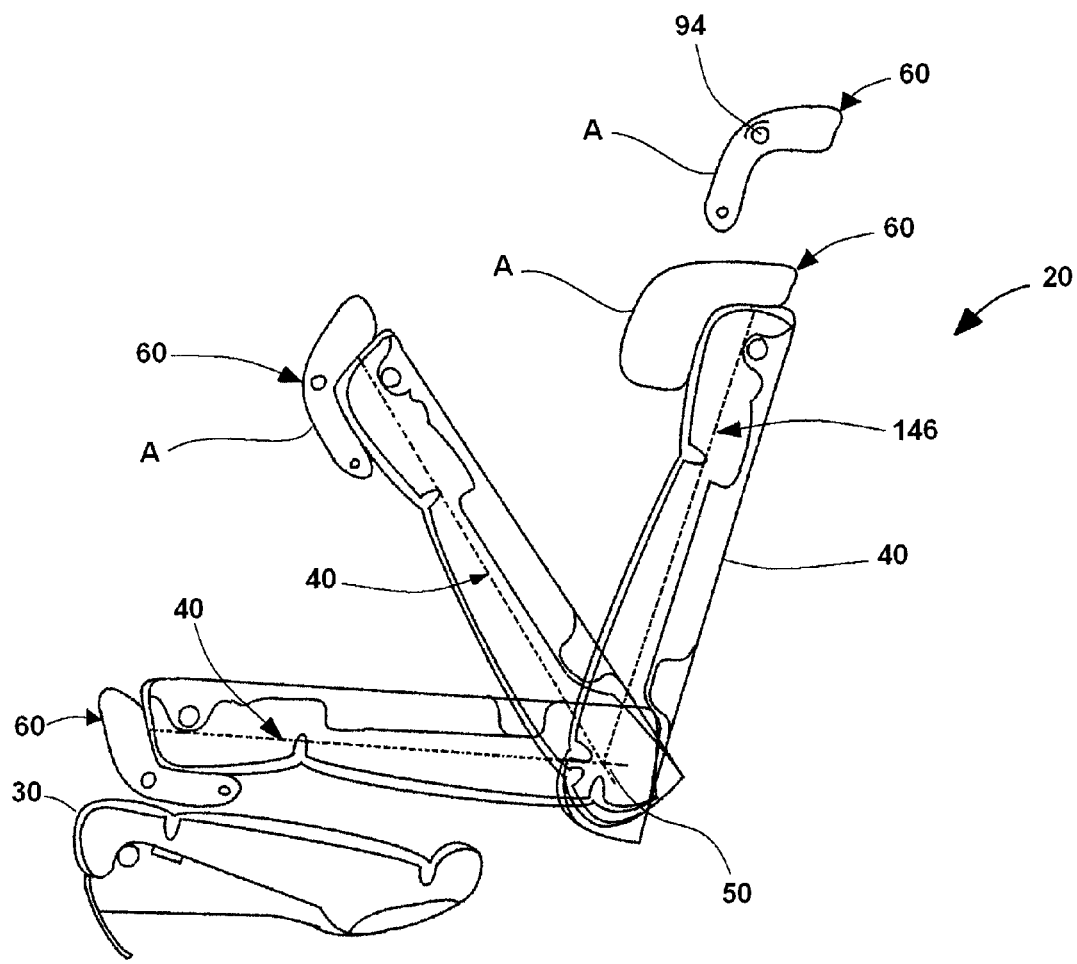
FIG. 10 is a schematic view of the seat and headrest in an upright, intermediate and folded position.
Figure 15:
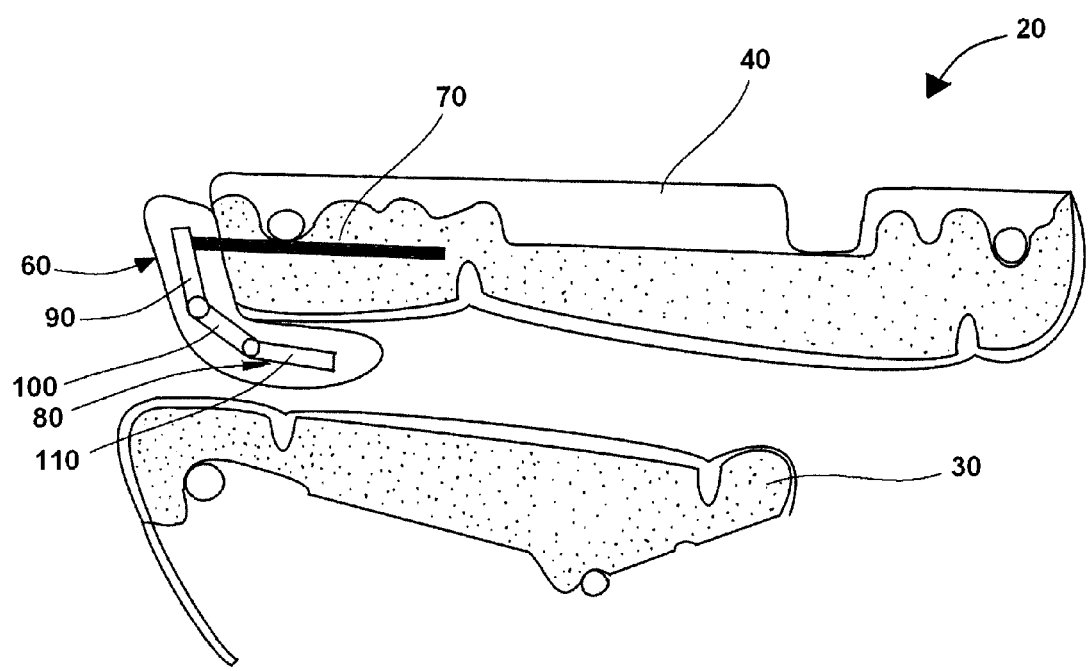
FIG. 15 is a partial sectional view of the seat in FIG. 14 along lines 15-15.

Turning now to FIG. 10, the seatback 40 of the seat assembly 20 is shown articulated between use and storage or fold-flat positions, with a headrest 60 according to the subject invention superimposed in each of the possible positions relative to the position of the seatback 40. With the seatback 40 in the upright position, as shown at the far right on FIG. 10, the headrest 60 is illustrated in both raised and lowered positions, with the internal linkage contorting the profile of the headrest bun when in the lowered position and the seatback 40 in the upright position to achieve the occupant discomfort described above. The cable 146 is shown schematically as a dashed line connected at its lowermost end to the pivoting feature of the seatback 40. As the seatback 40 is folded to a storage position, the cable 146 is automatically manipulated to relax the internal linkage structure or expansion assembly 80, thereby flattening the headrest 60 so that the bulged profile does not create an impediment to a flatly folded seatback 40. Thus, as shown in FIG. 15, the headrest 60 enjoys all of the advantages of a typical prior art shingle-style headrest when the seatback 40 is folded flat, which includes enabling the seatback 40 to be tightly folded against the seat cushion 30.

Figure 16:
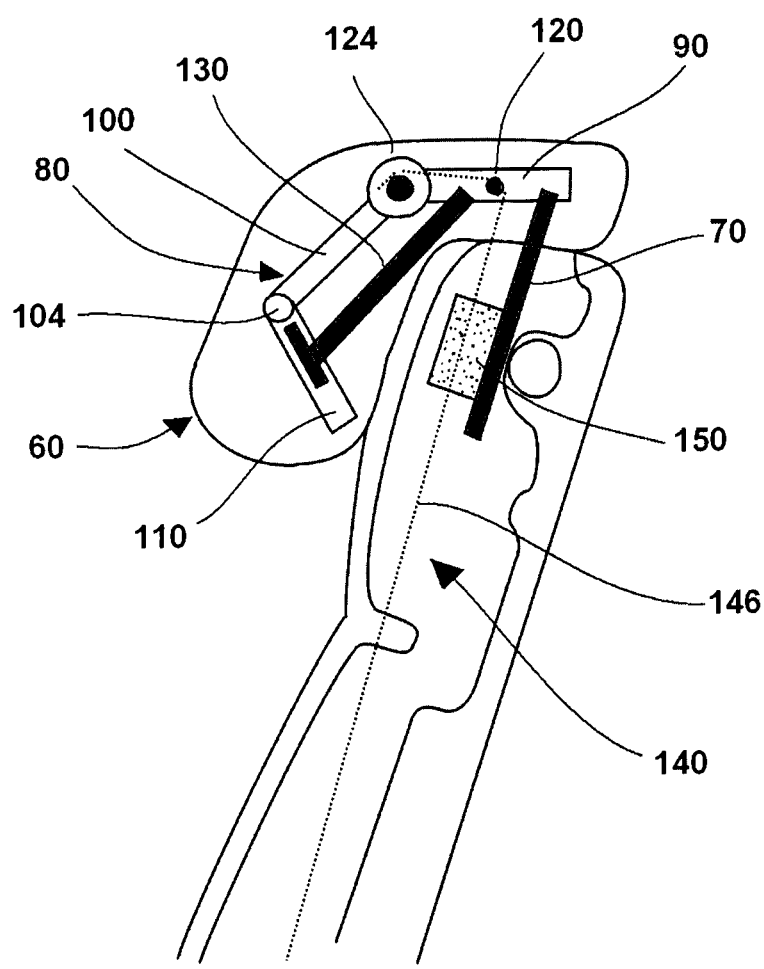
FIG. 16 is a schematic view of an exemplary seat and headrest in an exemplary expanded and lowered position.

FIG. 16 depicts yet another variation of this invention, wherein the first hinge 94 is rotated by the cable 146 and controls the distal link 110 with a modified push rod 130. The expansion assembly further includes a roller 120, such as a pulley or rod over which the cable 146 passes to a rotary lever 124. The hinges 94, 104 may include clock springs (not shown) to provide a biasing force. Other features of this alternative design will become readily apparent to those of skill in the art upon examination of FIG. 18, together with its annotations.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A seat assembly comprising:

a seatback pivotally coupled to a seat cushion and moveable relative to said seat cushion between an upright position and a folded position;

a headrest coupled to said seatback with at least one extension tube and moveable between a lowered position and a raised position;

wherein said headrest includes a linkage arrangement that automatically expands said headrest in a front-to-back direction in response to said seat assembly moving to a configuration with said seatback in said upright position and said headrest in said lowered position and automatically flattens said headrest in the front-to-back direction in response to at least one of said seatback moving to said folded position and said headrest moving to said raised position; and said linkage arrangement in said headrest including a fixed link that is fixed with said extension tube and an intermediate link pivotally coupled to said fixed link and a distal link that is pivotally coupled to said intermediate link and a push rod that is coupled with said intermediate link and is manipulatable to displace said intermediate link in said front-to-back direction.

* * * * *